No. 624,885. Patented May 9, 1899.
J. WITTMANN.
FLY NET.
(Application filed June 22, 1898.)
(No Model.)

Witnesses

John Wittmann, INVENTOR.
By Robert S. Carr
Atty.

UNITED STATES PATENT OFFICE.

JOHN WITTMANN, OF SEVEN MILE, OHIO.

FLY-NET.

SPECIFICATION forming part of Letters Patent No. 624,885, dated May 9, 1899.

Application filed June 22, 1898. Serial No. 684,195. (No model.)

*To all whom it may concern:*

Be it known that I, JOHN WITTMANN, a citizen of the United States, and a resident of Seven Mile, in the county of Butler and State of Ohio, have invented certain new and useful Improvements in Fly-Nets, of which the following is a specification.

My invention relates to fly-nets for horses or other animals; and the objects of my improvement are to cause the ordinary movements of the animal to impart increased agitation to the net, to make the net longitudinally extensible to fit animals of different size, and to prevent injury to the net and to the members of the harness to which it may be fastened by reason of the movements of the animal. These objects are obtained in the following-described manner, as illustrated in the accompanying drawings, in which—

Figure 1:
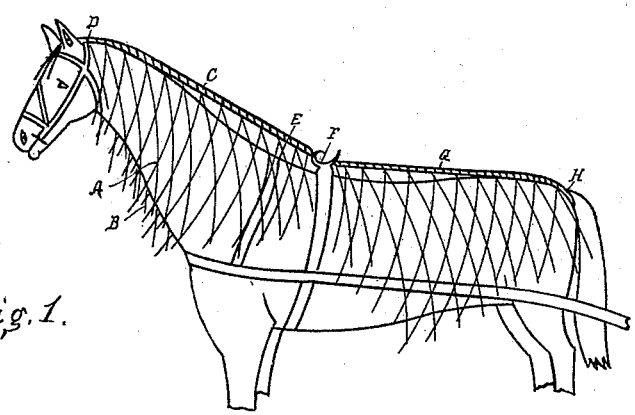
Figure 2:
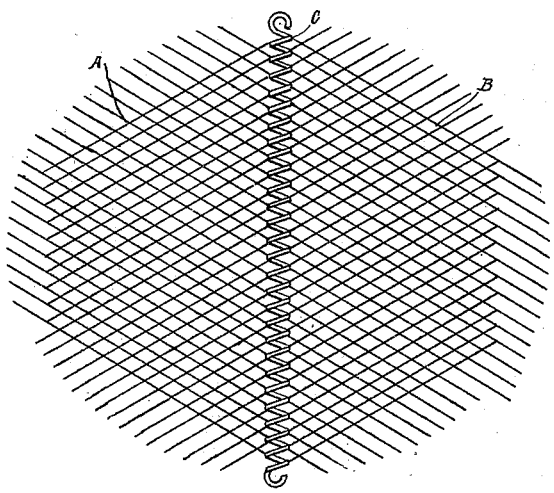

Figure 1 shows the fly-net in position on a horse. Fig. 2 is a plan view of the neck portion of the net.

In the drawings the sides or wings A and B of the net are secured at intervals to and depend from elastic band C, preferably formed of coil spring-wire. Said spring or band and the middle portion of the net attached thereto are extensible longitudinally. When the spring is placed under a slight tension, it is very sensitive and susceptible to vibratory movement that produces increased agitation of the body or wing portions of the net secured thereto. The neck portion of the net (shown in Fig. 2) is placed in position with the respective wings on opposite sides of the animal's neck and secured by fastening one end of the spring to the head-band D of the bridle and the other end to either the neck-band E or the saddle F of the harness and in such manner that the spring will be under some tension. The usual manner of securing the ends of the spring in position is by tying them with separate cords. Any movement of the animal will agitate the spring that is suspended in this manner and the wings of the net depending therefrom. The yielding of the spring will prevent it from interfering with the movements of the animal and will obviate any injury to the net or to the portions of the bridle or harness to which it may be connected.

The portion of the net that covers the animal's body is constructed in a similar manner and secured at intervals on a line drawn longitudinally through its center to a coil-spring G of the proper length. It may be secured in position by fastening the ends of the spring respectively to the saddle and to the crupper-strap H, when the movements of the animal will cause the spring to increase the agitation of the wings of the net depending therefrom and on opposite sides of the animal.

The wings of the net may be constructed of cord strings knotted together, of leather strings depending independently from the central spring, or in any other desirable manner that will permit the extension longitudinally of the middle portion of the net by means of the extension of the spring.

Less efficient results may be obtained, but at less cost, by the use of a short coil of spring as an extension of one or both ends of the rigid and unyielding middle band of the usual style of fly-nets.

Having fully described my improvement, what I claim as my invention, and desire to secure by Letters Patent of the United States, is—

In a fly-net the combination of a coiled-wire spring and the respective wings of the net, said wings of the net being secured to the spring at intervals and in a manner to depend therefrom and to yield longitudinally with the extension of the spring.

JOHN WITTMANN.

Witnesses:
ROBERT S. CARR,
FRANK P. RICHTER.